United States Patent
Rutsche et al.

(10) Patent No.: US 11,161,391 B2
(45) Date of Patent: Nov. 2, 2021

(54) FUEL-OPERATED VEHICLE HEATER AND METHOD FOR OPERATING A FUEL-OPERATED VEHICLE HEATER

(71) Applicant: Webasto SE, Stockdorf (DE)

(72) Inventors: Andreas Rutsche, Stockdorf (DE); Johannes Wilhelm, Stockdorf (DE); Alexander Rombold, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/463,200

(22) PCT Filed: Nov. 22, 2017

(86) PCT No.: PCT/EP2017/080109
§ 371 (c)(1),
(2) Date: May 22, 2019

(87) PCT Pub. No.: WO2018/095990
PCT Pub. Date: May 31, 2018

(65) Prior Publication Data
US 2019/0375273 A1 Dec. 12, 2019

(30) Foreign Application Priority Data

Nov. 25, 2016 (DE) ..................... 10 2016 122 821.4

(51) Int. Cl.
*B60H 1/22* (2006.01)
*B60H 1/03* (2006.01)
*F23N 5/24* (2006.01)

(52) U.S. Cl.
CPC .......... *B60H 1/2206* (2013.01); *B60H 1/032* (2013.01); *B60H 1/036* (2013.01);
(Continued)

(58) Field of Classification Search
CPC .......... B60H 1/2206; B60H 2001/2231; B60H 2001/224; B60H 2001/2243;
(Continued)

(56) References Cited

U.S. PATENT DOCUMENTS 3,687,122 A * 8/1972 Kamo ..................... F02N 19/08
123/550
5,480,093 A 1/1996 Tochizawa et al.
(Continued)

FOREIGN PATENT DOCUMENTS

DE       2929619 C2    3/1988
DE    19524422 A1 * 1/1997 ........... B60H 1/2206
(Continued)

OTHER PUBLICATIONS

"EP_0337408_A2_M—Machine Translation.pdf", machine translation, EPO.org., Jan. 10, 2020.*
(Continued)

*Primary Examiner* — Steven B McAllister
*Assistant Examiner* — Daniel E. Namay
(74) *Attorney, Agent, or Firm* — Quarles & Brady LLP

(57) ABSTRACT

A method for operating a fuel-operated vehicle heater, wherein after receipt of a switch-off signal by a control unit of the fuel-operated vehicle heater, a shutdown phase is initiated, during which remaining fuel present in the fuel-operated vehicle heater is combusted, and wherein a restart phase is initiated by the control unit after receipt of a switch-on signal during the shutdown phase, without the shutdown phase being terminated after complete combustion of the remaining fuel.

8 Claims, 2 Drawing Sheets

Figure 1:
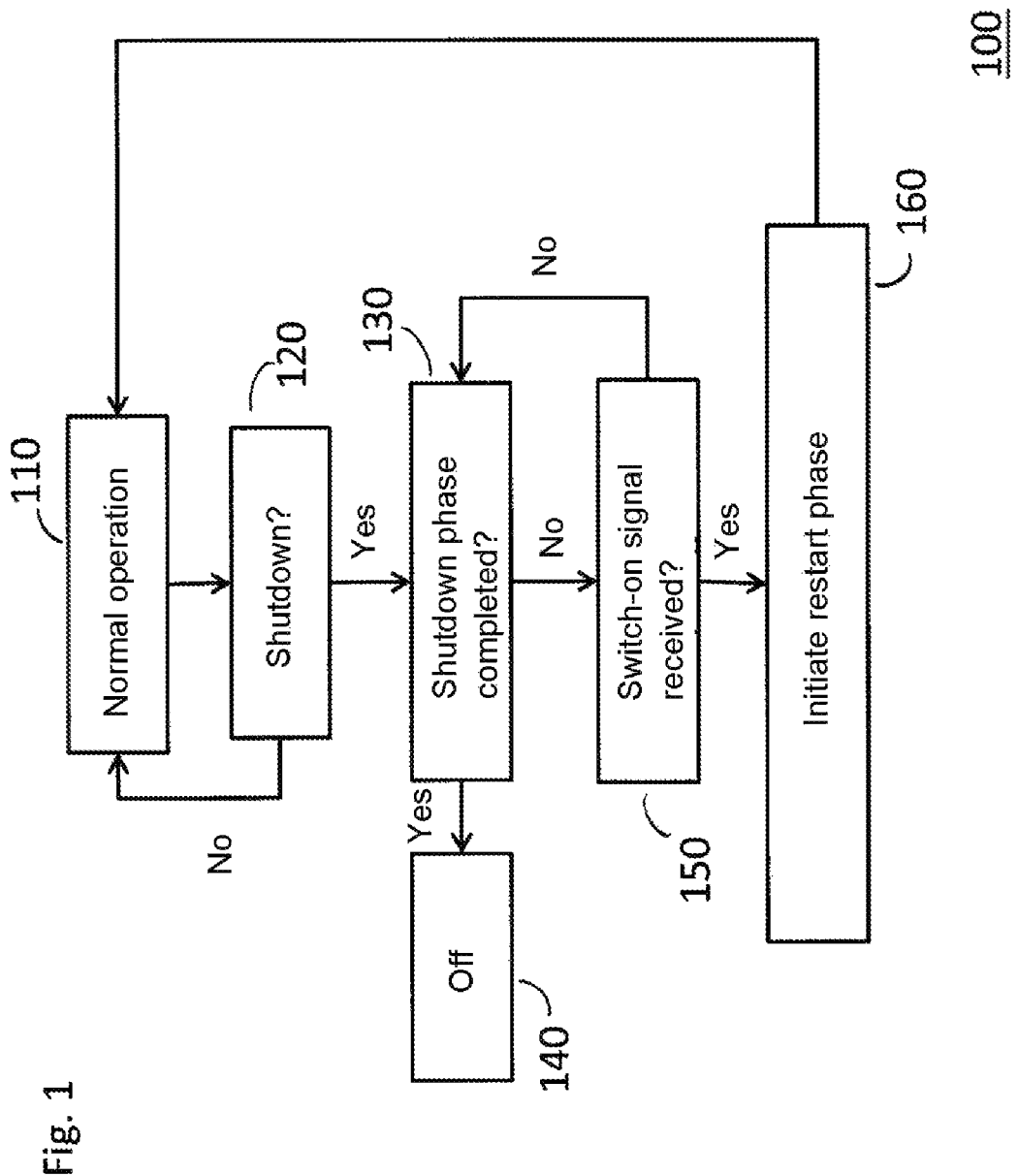

(52) U.S. Cl.
CPC ............... *B60H 2001/224* (2013.01); *B60H 2001/2231* (2013.01); *B60H 2001/2243* (2013.01); *B60H 2001/2262* (2013.01); *B60H 2001/2281* (2013.01); *B60H 2001/2284* (2013.01); *F23N 5/24* (2013.01)

(58) Field of Classification Search
CPC .... B60H 2001/2262; B60H 2001/2281; B60H 2001/2284; B60H 1/032; B60H 1/036; F23C 2201/301; F23C 2201/30; F23D 5/16; F23D 5/14; F23D 2202/00; F23D 2209/30; F23D 2900/21002; F23N 2241/14; F23N 5/24; F23N 5/242; F23N 5/245
USPC ...................................... 237/5, 12; 431/6, 12
See application file for complete search history.

(56) References Cited

U.S. PATENT DOCUMENTS

| | | | | |
|---|---|---|---|---|
| 5,893,710 A * | 4/1999 | Brenner | ............. | B60H 1/2206 432/222 |
| 5,894,988 A * | 4/1999 | Brenner | ............. | B60H 1/2206 431/6 |
| 6,048,198 A | 4/2000 | Okada et al. | | |
| 6,078,107 A * | 6/2000 | Kahnau | ............. | B60H 1/00978 307/10.1 |
| 2014/0008449 A1* | 1/2014 | Eger | ............. | B60H 1/2206 237/12.3 C |
| 2014/0346242 A1* | 11/2014 | Jozinovic | ............. | F23C 7/06 237/32 |
| 2015/0298523 A1* | 10/2015 | Patel | ............. | B60H 1/00964 237/2 A |
| 2017/0153026 A1* | 6/2017 | Dell | ............. | B60H 1/2203 |
| 2018/0037088 A1* | 2/2018 | Pfister | ............. | F23N 5/14 |
| 2018/0172268 A1* | 6/2018 | Ilchenko | ............. | B60H 1/2203 |
| 2018/0172269 A1* | 6/2018 | Dell | ............. | F23D 5/04 |

FOREIGN PATENT DOCUMENTS

| | | | | |
|---|---|---|---|---|
| DE | 19601517 A1 | 7/1997 | | |
| DE | 10025953 A1 | 12/2001 | | |
| DE | 10050950 C1 | 8/2002 | | |
| DE | 102008008895 A1 | 8/2009 | | |
| EP | 0337408 A2 | 10/1989 | | |
| GB | 2324855 A * | 11/1998 | ............... | F23R 3/28 |
| JP | S5866748 A | 4/1983 | | |
| JP | 62149508 A * | 7/1987 | ......... | G05D 23/1919 |
| JP | 01262214 A * | 10/1989 | ............. | F23N 5/102 |
| JP | H06159658 A | 6/1994 | | |
| JP | H06278450 A | 10/1994 | | |
| JP | 08020226 A * | 1/1996 | ......... | B60H 1/00007 |
| JP | H1151332 A | 2/1999 | | |
| JP | 11324875 A * | 11/1999 | ............. | F23N 1/022 |
| JP | 2000121048 A | 4/2000 | | |
| WO | WO-9702150 A1 * | 1/1997 | ........... | B60H 1/2206 |

OTHER PUBLICATIONS

"JP_11051332_A_H—Machine Translation.pdf", machine translation, J-PlatPat. (Year: 2021).*

"JP_06278450_A_M—Machine Translation.pdf", machine translation, J-PlatPat. (Year: 2021).*

"JP_06159658_A_M—Machine Translation.pdf", machine translation, J-PlatPat. (Year: 2021).*

"JP_2000121048_A_M—Machine Translation.pdf", machine translation, J-PlatPat. (Year: 2021).*

"JP_58066748_A_M—Machine Translation.pdf", machine translation, J-PlatPat. (Year: 2021).*

* cited by examiner

FUEL-OPERATED VEHICLE HEATER AND METHOD FOR OPERATING A FUEL-OPERATED VEHICLE HEATER

This application represents the national stage entry of PCT International Application No. PCT/EP2017/080109 filed Nov. 22, 2017 and claims priority to German Patent Application No. 10 2016 122 821.4 filed Nov. 25, 2016. The contents of these applications are hereby incorporated by reference as if set forth in their entirety herein.

The present disclosure relates to a fuel-operated vehicle heater and a method for operating the same.

Described is a method for operating a fuel-operated vehicle heater, wherein after receipt of a switch-off signal by a control unit of the fuel-operated vehicle heater, a shutdown phase is initiated, during which remaining fuel present in the fuel-operated vehicle heater is combusted, and wherein a restart phase is initiated by the control unit after receipt of a switch-on signal during the shutdown phase, without the shutdown phase being terminated after complete combustion of the remaining fuel. In this way, the time period until the desired heating power of the fuel-operated vehicle heater is reached again after the fuel-operated vehicle heater has been switched off, i.e., after the receipt of a switch-off signal initiating the shutdown phase, can be reduced when the vehicle heater has been switched-on again. Usually, the shutdown phase is initiated after receipt of the switch-off signal to avoid fuel residues in the fuel-operated vehicle heater. Remaining fuel, i.e., fuel that has already reached the burner, is completely burned in a controlled manner in the fuel-operated vehicle heater during the shutdown phase. This prevents harmful emissions, unpleasant smells and deposits in the inside of the fuel-operated vehicle heater. Without this burning of the remaining fuel during the shutdown phase, the remaining fuel is merely warmed up due to the remaining heat of the fuel-operated vehicle heater and partly converted into cokings and blue smoke. The emissions of harmful substances from the fuel-operated vehicle heater also increase without a shutdown phase. Furthermore, the formation of deposits, blue smoke and increased emissions of harmful substances are promoted by the remaining fuel still present in the vehicle heater when the fuel-operated vehicle heater is restarted, partly due to the then still low temperature. This can be avoided if the shutdown phase is carried out completely, i.e., if the burning of the remaining fuel is carried out completely. The result is that it is not possible to restart the fuel-operated vehicle heater during the shutdown phase. Only when the shutdown phase has been completed, the fuel-operated vehicle heater is in an operating state that allows it to be switched-on again.

The present disclosure is based on the insight that it is possible to switch-on the fuel-operated vehicle heater again even during the shutdown phase by exploiting the flame still present, which is used for the complete combustion of any remaining fuel during the shut-down phase. Despite the premature termination of the shutdown phase, i.e., although the remaining fuel in the fuel-operated vehicle heater is not completely burned, deposits, increased exhaust emission values and unpleasant smells are efficiently avoided. Such an approach is particularly advantageous for a vehicle that performs a large number of short distance drives in quick succession, where for economic reasons, the vehicle briefly switches off the vehicle engine and the fuel-operated vehicle heater between the individual drives so that the vehicle is at best partially heated. The method described here achieves a considerable increase in comfort without undesirable side effects having to be accepted. Complete combustions of the remaining fuel is understood as the essentially complete conversion of the remaining fuel to carbon dioxide and water.

Advantageously, it may be provided that during the shutdown phase, combustion air is supplied to a burner of the fuel-operated vehicle heater while no new fuel is supplied to the burner. In this way, the remaining fuel that was previously present in the fuel-operated vehicle heater and that is already present in the burner can be burned with a sufficient amount of combustion air.

It may also be provided that combustion air and new fuel are supplied to the burner during the restart phase. In this way, the heating power of the fuel-operated vehicle heater can be quickly increased to the desired heating power value by burning fuel newly supplied to the burner, without first having to completely shut down the fuel-operated vehicle heater. An additional promotion of the combustion by an ignition device, for example by a glow plug, can be unnecessary, since the remaining heat in the fuel-operated vehicle heater and the flame still present during the shutdown phase may be sufficient to resume the normal heating operation. However, in case of unfavorable operating conditions promoting the combustion by the ignition device can also be advantageous or even necessary.

Furthermore, it may be provided that an amount of fuel $V_{restart}$ supplied to the burner at the beginning of the restart phase corresponds to an amount of fuel $V_{shutdown}$ supplied at the beginning of the shutdown phase, when the shutdown phase lasts for less than a predetermined time interval $\Delta t_1$ at receipt of the switch-on signal. The fuel operated vehicle heater contains sufficient thermal energy to evaporate any remaining fuel present at the beginning of the shutdown phase so that the flame in the fuel-operated vehicle heater is self-sustaining by supplying a sufficient amount of combustion air. Since no new fuel is supplied to the burner during the shutdown phase, the heating power of the fuel-operated vehicle heater decreases continuously and the present flame becomes smaller. The flame present in the fuel-operated vehicle heater is sufficiently large to immediately evaporate and burn the amount of fuel supplied immediately before the start of the shutdown phase without extinguishing the flame during the initial predetermined time interval $\Delta t_1$. The time interval $\Delta t_1$ can be for example between 15 and 45 seconds, preferably, the time interval $\Delta t_1$ has a length of 30 seconds.

Furthermore, it may be provided that an amount of fuel $V_{restart}$ supplied to the burner at the beginning of the restart phase corresponds to a fraction of an amount of fuel $V_{shutdown}$ supplied immediately before the shutdown phase begins, when the shutdown phase lasts for more than a predetermined time interval $\Delta t_1$ at receipt of the switch-on signal. In this way, extinguishing of the flame still present in the fuel-operated vehicle heater can be prevented even after the time interval $\Delta t_1$ has elapsed. The amount of fuel $V_{restart}$ supplied may be half, one third or one quarter of the amount of fuel $V_{shutdown}$ supplied immediately before the start of the shutdown phase.

In this regard, it may be provided that the amount of fuel $V_{restart}$ supplied to the burner at the beginning of the restart phase is increased during a further time interval $\Delta t_2$ from the fraction of the amount of fuel $V_{shutdown}$ supplied immediately before the shutdown phase begins to the amount of fuel $V_{shutdown}$ supplied at the beginning of the shutdown phase. The further time interval $\Delta t_2$ can have for example a length between 10 and 20 seconds. Preferably, the further time interval $\Delta t_2$ can have a length of 15 seconds. The increase starting from the amount of fuel $V_{restart}$ supplied at the beginning of the restart phase to the amount of fuel $V_{shutdown}$ at the beginning of the shutdown phase can take place for example linearly, gradually or progressively, i.e., initially slowly and then faster, during the further time interval $\Delta t_2$. The increase to the amount of fuel $V_{shutdwon}$ supplied before the start of the shutdown phase can also take place vice versa, i.e., digressively or as a combination of the options mentioned above.

Advantageously, it may be provided that the amount of combustion air $V_{air}$ supplied to the burner during the restart phase is adapted to the amount of fuel $V_{restart}$ supplied to the burner such that during the entire restart phase an air number $\lambda$ is maintained, which is constant over time or which follows a predetermined temporal course. This allows an efficient combustion and causes a low emission of harmful substances during the restart phase. The air number $\lambda$, also called air ratio or combustion air ratio, is the dimensionless ratio between the mass ratio of the supplied combustion air and the supplied fuel. A combustion air ratio $\lambda=1$ describes a stoichiometric, i.e., a complete, combustion of the present fuel and the present oxygen in the combustion air. A value of $\lambda>1$ denotes a lean fuel combustion air mixture, in which more combustion air is supplied than is necessary for complete combustion of the fuel supplied during the same time period. By keeping a certain air number $\lambda$ at a temporally constant value or on a predeterminable temporal course, a smoke and smell optimized operation can be realized in addition to minimizing the emission of harmful substances.

Also described is a fuel-operated vehicle heater with a control unit configured to perform the method described above.

The disclosure described above is now explained by way of example with reference to the accompanying drawings using a preferred embodiment.

Figure 2:
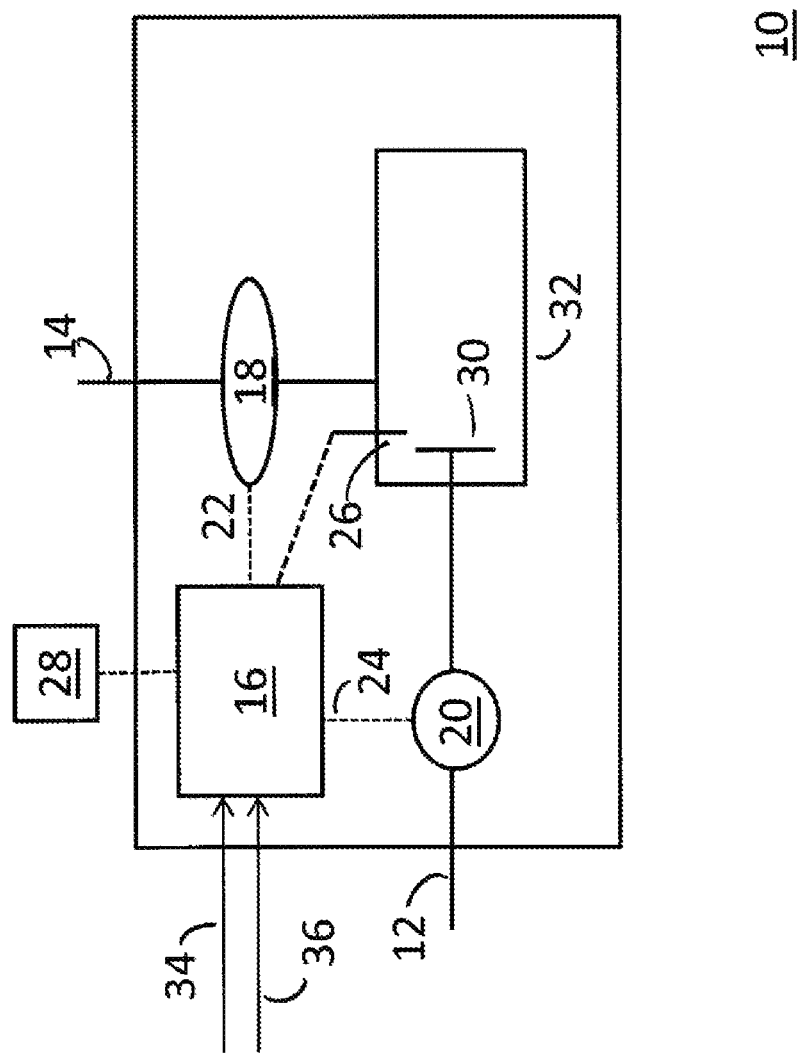

It shows:

FIG. 1 a flow diagram of a method for operating a fuel-operated vehicle heater; and FIG. 2 a schematic illustration of a fuel-operated vehicle heater.

FIG. 1 shows a flow diagram of a method 100 for operating a fuel-operated vehicle heater. The described method 100 starts for example in a normal operation 110. Starting from this, it is checked in step 120, whether a switch-off signal is received. This can be done, for example, in a control unit of the fuel-operated vehicle heater. If no switch-off signal is received, step 120-No, normal operation is maintained. If, on the other hand, the switch-off signal is received, step 120-Yes, a shutdown phase is initiated and in a subsequent step 130, it is checked whether the shutdown phase has been completed. The shutdown phase can also be controlled by the control unit. Any present fuel, i.e., remaining fuel, can be burned in a controlled manner in a burner of the fuel-operated vehicle heater during the shutdown phase. If the shutdown phase is completed, step 130-Yes, the fuel-operated vehicle heater is switched-off, step 140. If, on the other hand, the shutdown phase is not completed, step 130-No, it is checked whether a switch-on signal is received in a subsequent step 150. If no switch-on signal is received, step 150-No, it is checked again whether the shutdown phase is terminated in step 130. If, on the other hand, a switch-on signal is received, step 150-Yes, a restart phase of the fuel-operated vehicle heater is initiated in a subsequent step 160 and it is continued in normal operation 110 after completion of the restart phase. The restart phase can, for example, be characterized by reaching an operating state which is identical to an operating state which was present as normal operating state immediately before the initiation of the shutdown phase.

The shutdown phase can in particular be characterized in that combustion air is supplied to the burner while no new fuel is supplied to the burner. The restart phase can in particular be characterized in that besides combustion air new fuel is supplied to the burner.

FIG. 2 shows a schematic illustration of a fuel-operated vehicle heater 10. The fuel-operated vehicle heater 10 shown in FIG. 2 is supplied with fuel via a fuel line 12 and with combustion air via a combustion air line 14. The supplied combustion air can be conveyed via a combustion air supply device 18 to a burner 32. The supplied fuel can be conveyed via a fuel supply device 20 to the burner 32. The fuel supplied to the burner 32 can, for example, be thermally evaporated in a fuel evaporator 30. The fuel evaporator 30 can comprise an evaporator fleece, in which a certain amount of supplied fuel is stored during normal operation so that fuel, which can be described as the remaining fuel, is still present in the burner 32 after switching off the fuel supply device 20. The combustion air supply device 18 can for example be designed as a throttle and/or blower. The fuel supply device 20 can for example be designed as a dosing pump. The combustion air supply device 18 and the fuel supply device 20 can be connected to a control unit 16 via a control line 22 and another control line 24 respectively. The control unit 16 can control the combustion air supply device 18 and the fuel supply device 20 via the two control lines 22, 24, for example to maintain a specific air number $\lambda$ during the operation of the fuel-operated vehicle heater 10. Furthermore, the fuel-operated vehicle heater 10 may include an ignition device 26, which may also be controlled by the control unit 16. The ignition device 26 can, for example, be a glow plug. The glow plug can, for example, promote the thermal evaporation of fuel in the fuel evaporator 30 during a starting phase of the fuel-operated vehicle heater 10. The ignition device 26 may optionally be operated during the restart phase of the fuel-operated vehicle heater 10, in order to avoid an extinguishing of the residual flame in the fuel-operated vehicle heater 10 until the normal operating condition is restored. Preferably, however, the ignition device 26 is not operated during the restart phase. For example, if an activation of the ignition device 26 is required during the restart phase at all, the ignition device 26 may be deactivated about 70% of the time and activated about 30% of the time. Also shown is a sensor device 28 via which the control unit 16 can record measured values, for example with regard to temperature and exhaust gases. These can be advantageous, for example, for the precise regulation of the desired air number $\lambda$ during operation of the fuel-operated vehicle heater. The control unit 16 can receive a switch-off signal 34 and a switch-on signal 36. Based on the reception of a switch-off signal 34, a shutdown phase can be initiated by the control unit 16 while the remaining fuel present in the burner 32 is burned completely in a controlled manner. If the control unit 16 receives the switch-on signal 36, either the switched-off fuel-operated vehicle heater 10 is switched-on in the usual manner or, if the switch-on signal 36 is received during the shutdown phase, a restart phase is initiated.

The features of the disclosure which are disclosed in the above description, in the drawings and in the claims may be essential both individually and in any desired combination for the purpose of implementing the disclosure.

LIST OF NUMERALS 10 fuel-operated vehicle heater
12 fuel line 14 combustion air line
16 control unit
18 combustion air supply device
20 fuel supply device
22 control line
24 further control line
26 ignition device
28 sensor device
30 fuel evaporator
32 burner
34 switch-off signal
36 switch-on signal
100 method
110 normal operation
120 shutdown?
130 shutdown phase completed?
140 off
150 switch-on signal received?
160 initiate restart phase

The invention claimed is:

1. Method for operating a fuel-operated vehicle heater, wherein after receipt of a switch-off signal by a control unit of the fuel-operated vehicle heater, a shutdown phase is initiated, during which remaining fuel present in the fuel-operated vehicle heater is combusted, and wherein a restart phase is initiated by the control unit after receipt of a switch-on signal during the shutdown phase, without the shutdown phase being terminated after complete combustion of the remaining fuel.

2. Method according to claim 1, wherein during the shutdown phase, combustion air is supplied to a burner of the fuel-operated vehicle heater while no new fuel is supplied to the burner.

3. Method according to claim 1, wherein combustion air and new fuel are supplied to the burner during the restart phase.

4. Method according to claim 3, wherein an amount of fuel $V_{restart}$ supplied to the burner at the beginning of the restart phase corresponds to an amount of fuel $V_{shutdown}$ supplied at the beginning of the shutdown phase when the shutdown phase lasts for less than a predetermined time interval $\Delta t_1$ at receipt of the switch-on signal.

5. Method according to claim 3, wherein an amount of fuel $V_{restart}$ supplied to the burner at the beginning of the restart phase corresponds to a fraction of an amount of fuel $V_{shutdown}$ supplied immediately before the shutdown phase begins when the shutdown phase lasts for more than a predetermined time interval $\Delta t_1$ at receipt of the switch-on signal.

6. Method according to claim 5, wherein the amount of fuel $V_{restart}$ supplied to the burner at the beginning of the restart phase is increased during a further time interval $\Delta t_2$ from the fraction of the amount of fuel $V_{shutdown}$ supplied immediately before the shutdown phase begins to the amount of fuel $V_{shutdown}$ supplied at the beginning of the shutdown phase.

7. Method according to claim 3, wherein the amount of combustion air $V_{air}$ supplied to the burner during the restart phase is adapted to the amount of fuel $V_{restart}$ supplied to the burner such that during the entire restart phase an air number $\lambda$ is maintained which is constant over time or which follows a predetermined temporal course.

8. Fuel-operated vehicle heater having a control unit configured to perform the method according to claim 1.

* * * * *